(12) United States Patent
Paille et al.

(10) Patent No.: US 7,148,743 B2
(45) Date of Patent: Dec. 12, 2006

(54) DEMODULATION DEVICE FOR REACQUIRING A MODULATED SIGNAL IF RECEPTION IS INTERRUPTED

(75) Inventors: Bruno Paille, Saint-Aupre (FR); Mariano Bona, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 10/944,286

(22) Filed: Sep. 17, 2004

(65) Prior Publication Data
US 2005/0105650 A1    May 19, 2005

(30) Foreign Application Priority Data
Sep. 19, 2003    (FR) .................................. 03 11042

(51) Int. Cl.
*H03D 3/00*    (2006.01)
(52) U.S. Cl. ........................ 329/310; 375/326; 375/324
(58) Field of Classification Search ................. 329/310; 375/326, 324
See application file for complete search history.

(56) References Cited

U.S. PATENT DOCUMENTS

| | | | |
|---|---|---|---|
| 5,999,559 A * | 12/1999 | Takaki | ......................... 375/130 |
| 6,510,188 B1 | 1/2003 | Isaksen et al. | .............. 375/345 |
| 6,879,646 B1 * | 4/2005 | Arambepola | ................ 375/326 |

FOREIGN PATENT DOCUMENTS

| | | |
|---|---|---|
| EP | 1 155 541 | 11/2001 |
| FR | 2 830 390 | 4/2003 |

OTHER PUBLICATIONS

French Preliminary Search Report dated Jul. 15, 2004 for French Application No. 03 11042.

* cited by examiner

*Primary Examiner*—Joseph Chang
(74) *Attorney, Agent, or Firm*—Lisa K. Jorgenson; Stephen Bongini; Fleit, Kain, Gibbons, Gutman, Bongini & Bianco P.L.

(57) ABSTRACT

A demodulation device is provided that includes first and second power control circuits and demodulation circuits. The first power control circuit keeps the amplitude of a modulated input signal constant, and the demodulation circuits applying a demodulation processing to the input signal. The second input signal power control circuit generates a control signal having a signal present state representing detection of the presence of the input signal and a signal disappeared state representing detection of disappearance of the input signal. The demodulation device further includes means for deactivating the demodulation circuits when the control signal changes from the signal present state to the signal disappeared state, and for activating the demodulation circuits when the control signal changes from the signal disappeared state to the signal present state so as to enable a fast restart of the demodulation processing.

19 Claims, 4 Drawing Sheets

DEMODULATION DEVICE FOR REACQUIRING A MODULATED SIGNAL IF RECEPTION IS INTERRUPTED

CROSS-REFERENCE TO RELATED APPLICATIONS

This application is based upon and claims priority from prior French Patent Application No. 03 11042, filed Sep. 19, 2003, the entire disclosure of which is herein incorporated by reference.

BACKGROUND OF THE INVENTION

The present invention relates in general to the domain of digital transmission techniques and more particularly to the domain of reception of a modulated signal transmitted through a cabled network.

One aspect of the present invention relates to a demodulation device comprising an input having a first power control circuit to maintain a constant amplitude of a modulated input signal in the presence of slow fluctuations in the amplitude of the carrier, with the modulated signal being transmitted to a set of demodulation circuits in series, on the output side of the first power control circuit, to apply a demodulation processing to the input signal.

The present invention is particularly suited for use in cabled networks in which transmitted signals are adapted to the ITU-J83 standards Annex A/B/C ("ITU" standing for "International Telecommunication Union"). Typically in this context, the transmitted signals are amplitude and phase modulated according to the QAM (Quadrature Amplitude Modulation) modulation technique.

Figure 1:
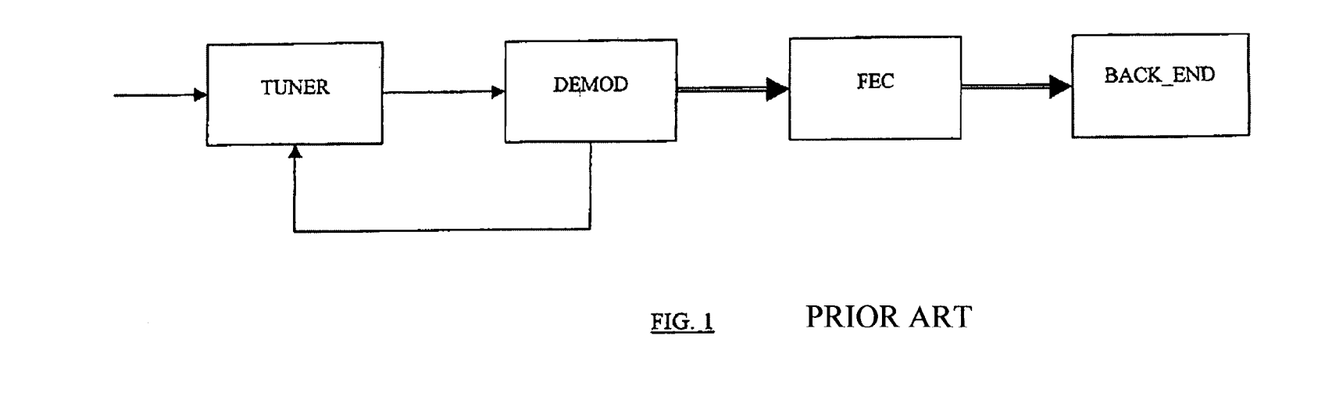
FIG. 1 illustrates the blocks of a conventional device for receiving a signal transmitted on a cable, and among these blocks.

FIG. 1 shows a system for reception of a modulated signal transmitted on a cable. This type of reception system is generally composed of the following blocks: a channels selector device TUNER, a demodulation device DEMOD, an error correction circuit FEC with no return channel and, connected to the output of the error correction circuit, a BACK_END processing circuit that depends on the type of data transmitted on the channel (for example, an MPEG decoder).

The channel selector device TUNER transposes the radio frequency analog signal, for example within the 48–900 MHz range, to an intermediate frequency analog signal, for example 36, 44 or 57 MHz, that the demodulator can use. The demodulator device estimates the symbols sent. In other words, it eliminates the modulation to enable the change from the intermediate frequency analog signal to a base band digital signal sampled at the data transmission speed. The error correction circuit FEC with no return channel uses error correction decoding. Therefore it corrects the error and eliminates the redundancy introduced into the signal by the encoder present in the modulation circuit. The output from the error correction circuit FEC is then composed of packets of bytes organized in the form of frames, called Transport Streams (TS), with a defined format and comprising synchronization data in addition to the transported data.

Figure 2:
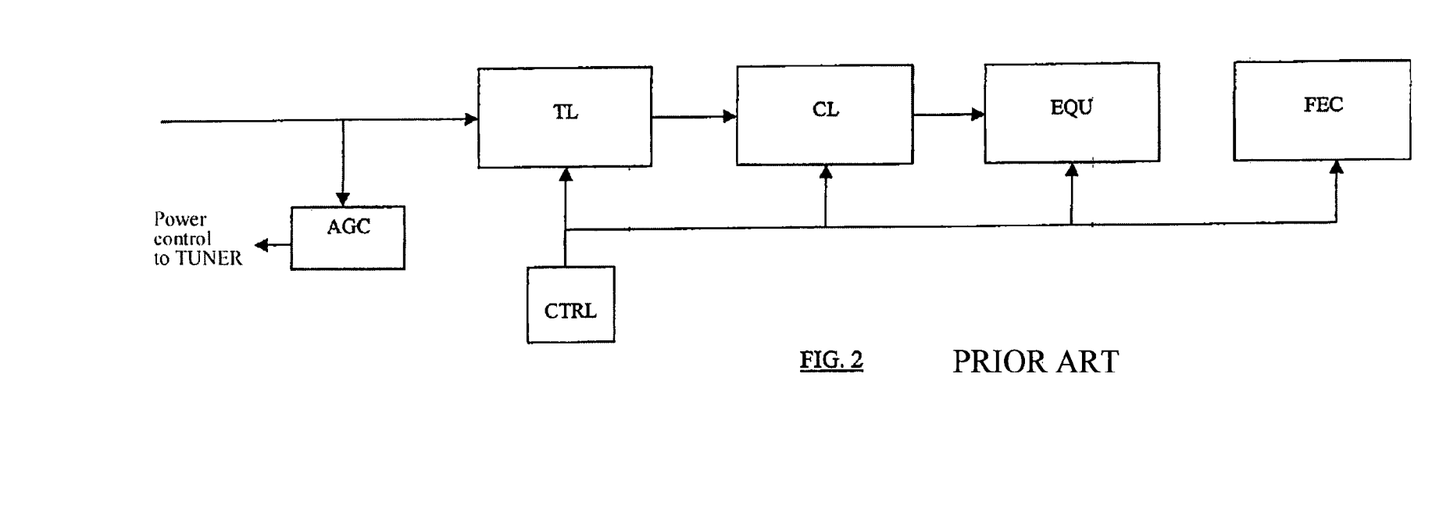
FIG. 2 illustrates in more detail the blocks of the demodulation device of FIG. 1.

The demodulation device in the reception system is conventionally composed of the demodulation circuits described in FIG. 2. An Automatic Gain Control (AGC) circuit is built into the input of the demodulation stage so as to keep the average level of the useful signal approximately constant before demodulation. This circuit advantageously makes a measurement of the power of the signal at the input to the reception device, and through a counter reaction loop, acts on the amplification of the input stages so as to keep the amplitude of the output signal constant in the presence of slow fluctuations of the carrier.

The demodulation device also comprises two synchronization loops. A first loop, called the timing loop TL, is designed to estimate and correct the error between data sending frequencies and the data reception frequency (for example, these frequencies are on the order of 5 MHz for the ITU A/B/C standards). The second loop, called the carrier loop CL, is designed to estimate and correct the error between data modulation and demodulation frequencies (this frequency is conventionally equal to 36, 44 or 57 MHz at the demodulator input).

An equalizer circuit EQU is also incorporated to estimate and correct linearity defects present in the transmission system. It also cancels out the different signal echoes. The equalizing circuit is conventionally composed of one or several adaptive filters.

Such demodulation circuits of the demodulator and FEC assembly are actually clocked at the rate of a clock frequency FClk, by elementary sequential elements. The clock frequency is usually greater than the data frequency and the rate of operations is usually controlled by a synchronization signal samp_en emitted through a control circuit CTRLC. When the samp_en signal is at logical level 1, the operation is performed. When it is at logical level 0, the operation is not performed. During normal operation, the samp_en signal is a periodic clock signal with a frequency proportional to the data reception frequency.

The following briefly describes the main operating steps used during reception of a channel by the reception system. Conventionally, the reception system operates in two modes: an acquisition mode and a "tracking" synchronization mode.

After the desired channel has been selected, the reception system is programmed in acquisition mode. In this mode, only the demodulation device DEMOD and the error correction circuit FEC are used. In acquisition mode, the automatic gain control AGC circuit of the demodulator begins by controlling the input power. When the power has been adjusted to its nominal level, the two synchronization loops TL and CL and the demodulator stage equalizer EQU are started. After convergence of the synchronization and equalizer loops, the demodulator changes to tracking mode.

In tracking mode, the demodulator follows and compensates for the slow variations in the characteristics of the signal received through the automatic gain control AGC circuit, the synchronization loops TL and CL and the equalizer EQU. Starting from this moment, the data output from the demodulator to the FEC circuit can be used. The FEC circuit then changes to acquisition mode.

After synchronization of the FEC, the transport stream TS at the output of the FEC circuit has the right frame structure and the BACK_END processing circuit can then be started in turn.

The time between selection of the required channel and synchronization of the transport stream TS at the output of the demodulator and FEC assembly is called TSyncDemodFEC and is on the order of 100 ms.

$$TSyncDemodFEC = TSyncDemod + TSyncFEC$$

where TsyncDemod is the demodulator synchronization time that is on the order of 80 ms and TSyncFEC is the synchronization time of the FEC circuit that is on the order of 20 ms.

The time necessary between synchronization of the FEC circuit and synchronization of the processing circuit is called TSyncBackEnd and is on the order of 500 ms.

Thus, a time "TSyncDemodFEC+TSyncBackEnd", which is on the order of 600 ms, is necessary between the time that the channel is selected and synchronization of the processing circuit.

Many physical phenomena can cause transmission "holes" that normally result in short interruptions to signal reception by the demodulator. A typical case of short interruptions to signal reception is disconnecting and then reconnecting the reception cable.

Thus, when the reception cable is accidentally disconnected and then reconnected, the signal disappears for a short moment. However, this short disappearance of the signal causes loss of synchronization of the demodulator device, and in particular causes desynchronization of the timing and carrier loops and divergence of the equalizer. The demodulator is therefore desynchronized and the result is desynchronization of the FEC circuit and the BACK_END processing circuit.

One current solution to overcome this problem is to detect the loss of synchronization of circuits in the reception device, and then reprogram the demodulator and FEC assembly in acquisition mode and wait for these circuits to be resynchronized. In particular, detection of loss of synchronization normally is done by detecting that the transport stream TS at the output of the FEC circuit is corrupted, or that the data at the output of the BACK-END circuit is corrupted. In this case, the demodulator changes back to acquisition mode. Reception is then interrupted for a time defined as follows.

Tinterruption+TDetect+TSyncDemod+TSyncFEC+
TSyncBackEnd where TDetect is the time to detect the loss of synchronization of the output of the FEC circuit (or at the output of the BACK_END circuit) and Tinterruption is the time of interrupted communication on the cable.

Therefore, due to the time necessary to resynchronize the different reception circuits, and particularly the demodulator circuit, the reception interruption time is a major disadvantage when the signal accidentally disappears for a short moment.

Moreover, this problem requires action by the software controlling the different operating modes of the reception system since the demodulator and FEC assembly have to be reprogrammed in acquisition mode so that these circuits can be resynchronized following a short disappearance of the signal. The processing unit of the reception system using the control software is therefore permanently busy throughout the duration of the channel reception process to ensure that operations take place correctly and to take action if the signal disappears at the input to the demodulator for a short instant, and consequently its resources cannot be released for other purposes.

SUMMARY OF THE INVENTION

One object of the present invention is to solve the above mentioned disadvantages and reduce the duration of the loss of reception of the signal in the case of a short interruption in signal reception, for example due to accidental disconnection of the reception cable, and enable fast restart of the demodulation processing by the demodulation circuits when the signal is restored.

Another object of the present invention is to perform a restart operation without the need for any external control of the reception system, and particularly without the need for any action by the software controlling the different operating modes of the reception system to manage this operation if the signal disappears at the input of the demodulator for a short instant.

A further object of the present invention is to provide a system for reception of a modulated signal that includes such a demodulator device.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

One preferred embodiment of the present invention provides a demodulator device comprising, at the input, a first power control circuit to maintain a constant amplitude of a modulated input signal in the presence of slow fluctuations in the amplitude of the carrier. The modulated signal is transmitted to a set of demodulation circuits in series on the output side of the first power control circuit, to apply a demodulation processing to the input signal. The device further comprises a second input signal power control circuit designed to generate a control signal that can be in two states: a "signal present" state representing detection of the presence of the input signal, and a "signal disappeared" state representing detection of the absence of the signal. Additionally, there is a means for deactivating the demodulation circuits when the control circuit changes from the signal present state to the signal disappeared state, so as to prevent them from becoming desynchronized, and for activating the demodulation circuits when the control signal changes from the signal disappeared state to the signal present state, so as to enable a fast restart of the demodulation processing.

According to one embodiment of the present invention, the demodulation circuits are clocked by a synchronization signal that may be in a first state in which the demodulation circuits are active and a second state in which the demodulation circuits are inactive. The deactivation and activation means of the logic circuit is designed to force the synchronization signal into the second state when the control circuit is in the signal disappeared state, and to maintain the synchronization signal in the first state when the control signal is in the signal present state.

Preferably, the deactivation and activation means includes an AND logic circuit that receives the control signal transmitted by the second power control circuit on a first input and the synchronization signal on a second input. The output of the AND logic circuit is connected to each of the demodulation circuits, with the signal present state of the control signal corresponding to a high logical signal and the signal disappeared state of the control signal corresponding to a low logical state.

In some embodiments, the second power control circuit includes a power estimating circuit for estimating the power of the input signal, and the power estimating circuit is associated with a state machine with at least two states controlled by a double threshold detection with hysteresis. The state machine generates the control signal in the signal present state when the estimated power exceeds a first threshold corresponding to a threshold for detection of the presence of the input signal, and in the signal disappeared state when the estimated power is lower than a second threshold corresponding to a threshold for detection of disappearance of the input signal.

According to one particular embodiment, the state machine includes means for memorizing demodulation parameters of the input signal whenever the input signal is detected as being present during at least two successive power estimates, and means of configuring the demodulation circuits as a function of the parameters memorized when the control signal changes from the signal disappeared state to the signal present state.

According to some embodiments, the first state of the synchronization signal corresponds to a clock signal and the second state of the validation signal corresponds to a low logical state.

Further, according to some embodiments, the demodulation circuits that will be deactivated during detection and disappearance of the input signal comprise two synchronization loops and an equalizing circuit.

Preferably, the demodulation circuits that will be deactivated following detection of disappearance of the input signal also comprise an error correction circuit without a return channel.

In preferred embodiments, the input signal is an amplitude and phase modulated signal using the QAM modulation technique, transmitted through a cabled network.

The present invention also provides a system for reception of a modulated signal that includes such a demodulator device.

Exemplary embodiments of the present invention will now be described in detail with reference to FIGS. 3–5.

The present invention is based on the principle of detecting the disappearance of the modulated input signal as early as possible in the demodulation circuits of the demodulator device so as to avoid desynchronization of these circuits. As explained above, this type of desynchronization may for example occur if there is short interruption in signal reception due to disconnection and reconnection of the reception cable.

Figure 3:
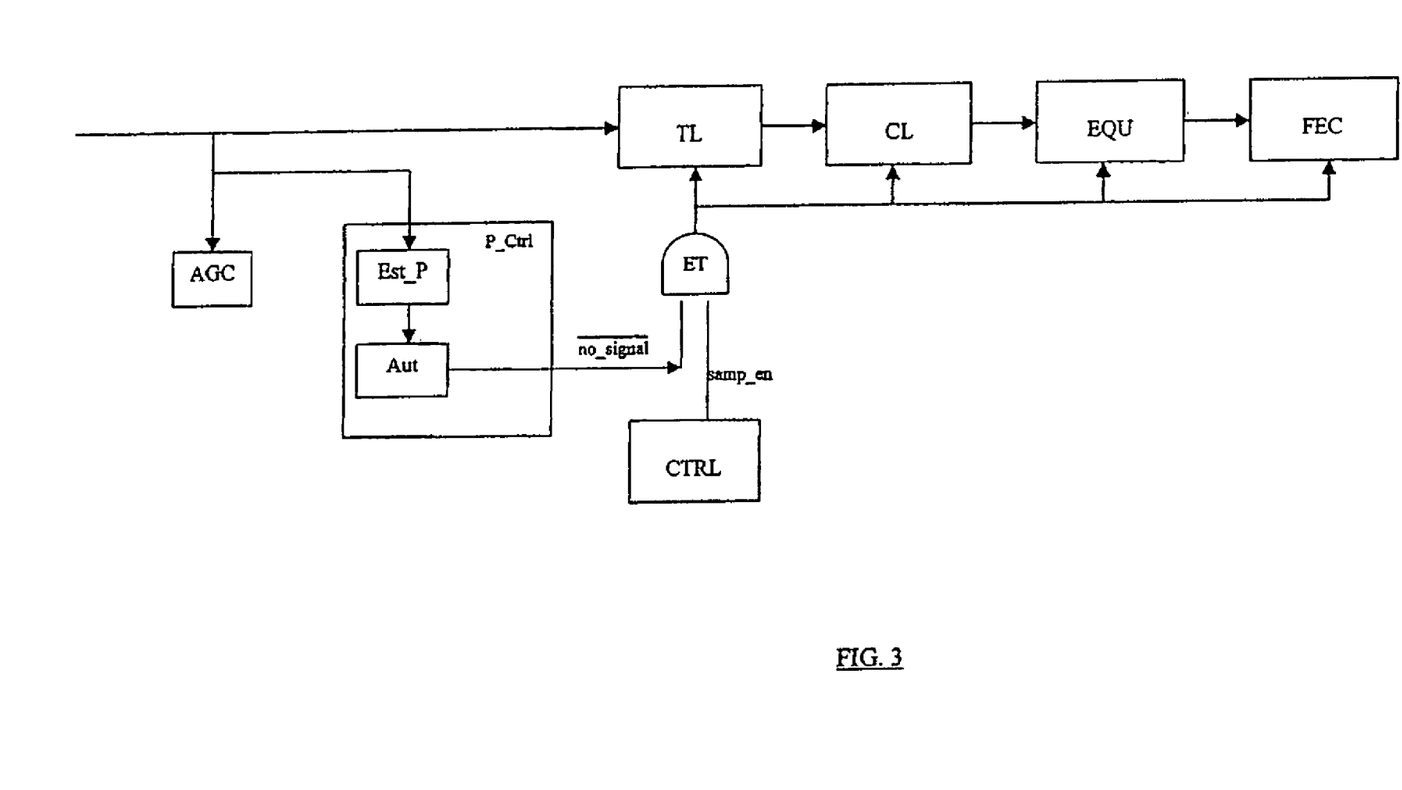
FIG. 3 illustrates a demodulator device according to a preferred embodiment of the present invention.

FIG. 3 illustrates a demodulator device according to a preferred embodiment of the present invention. Elements in common in FIGS. 2 and 3 have been described above and have the same reference labels. As shown, a second power control circuit P_Ctrl is added at the input of the demodulator to detect disappearance of the modulated input signal.

The function of this second power control circuit P_Ctrl is to generate a $\overline{no\_signal}$ control signal that may be in two different states: a "signal present" state representing detection of the presence of the input signal, and a "signal disappeared" state representing detection of disappearance of the input signal. In this exemplary embodiment, the signal present state in the $\overline{no\_signal}$ control signal corresponds to a high logical state, and the signal disappeared state of the control signal corresponds to a low logical state.

To achieve this, the P_Ctrl circuit includes a power estimating circuit Est_P for estimating the power of the modulated circuit at the input to the demodulator device.

According to one particular embodiment, the power of the input signal is estimated in the Est_P circuit by calculating the modulus of the input signal. A simplified way of calculating the power of a signal S is provided in the following formula.

$$P(S)=\max\,(abs(S))+0.5*\min(abs(S))$$

where abs denotes the absolute value.

In one preferred embodiment, the power estimating circuit Est_P is designed to output the result of its estimate to a state machine Aut with at least two states, controlled by detection with two thresholds with hysteresis, so as to manage the signal present/signal disappeared state.

Figure 4:
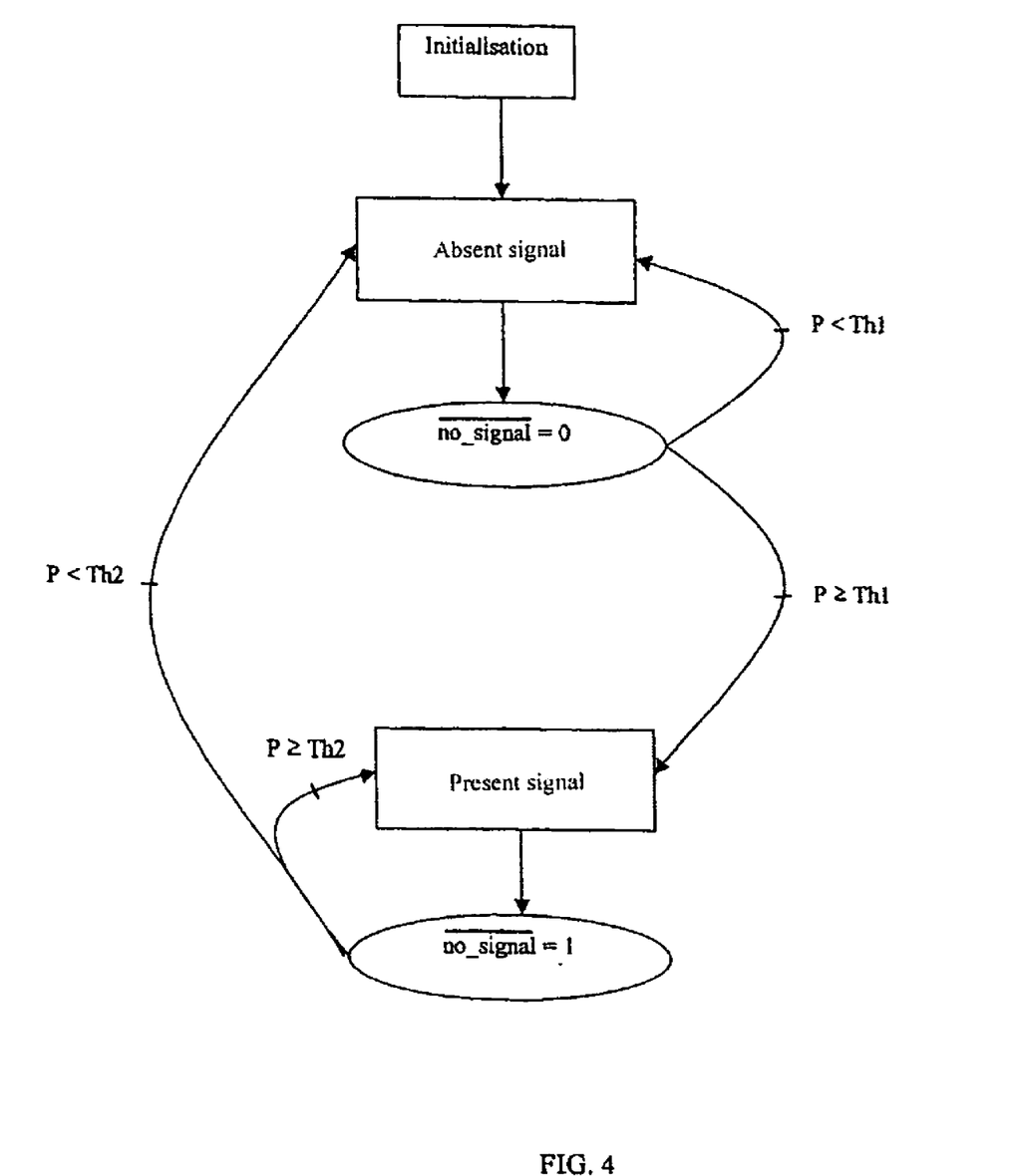
FIG. 4 illustrates management of the signal present and signal disappeared states in a first embodiment of the present invention.
Figure 5:
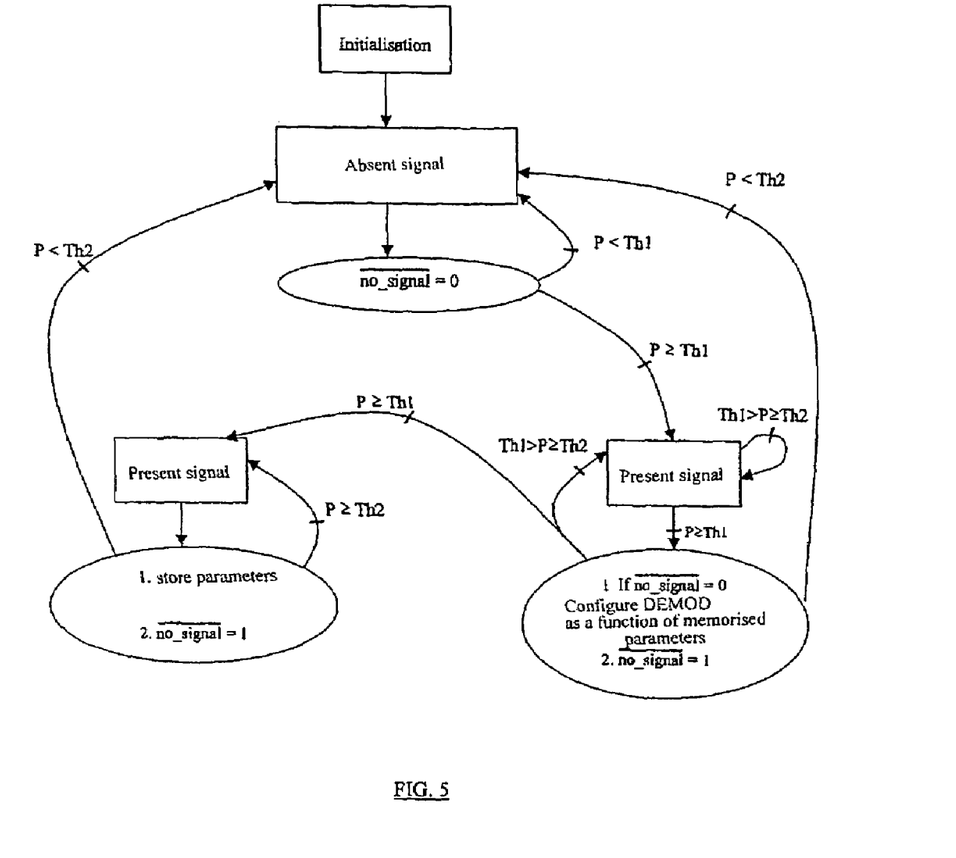
FIG. 5 illustrates management of the signal present and signal disappeared states in a second embodiment of the present invention.

FIG. 4 shows management of corresponding signal present and signal disappeared states by the state machine in a first embodiment of the present invention. In FIG. 4, P corresponds to the current estimate of the power of the input signal made by the power estimating circuit Est_P. Th1 corresponds to the signal detection threshold and Th2 corresponds to the signal disappearance threshold. Normally, Th1≧Th2.

The state machine Aut is designed to generate the $\overline{no\_signal}$ control signal in the signal present state when the estimated power P is greater than the first threshold Th1 (P≧Th1) that corresponds to the input signal presence detection threshold, and in the signal absent or disappeared state when the estimated power P drops below the second threshold Th2 (P<Th2) corresponding to the input signal disappearance detected threshold.

The demodulator device according to this embodiment of the present invention also comprises means for deactivating the demodulation circuits TL, CL, and EQU, and possibly the FEC circuit, when the $\overline{no\_signal}$ control signal changes from the signal present state to the signal disappeared state, so as to prevent these circuits from becoming desynchronized, and for activating the demodulation circuits when the control signal changes from the signal disappeared state to the signal present state, so as to enable fast start of the demodulation processing by the demodulation circuits once the input signal reception is restored.

One exemplary embodiment for deactivation and activation of the demodulation circuits will now be described with reference to FIG. 3.

Conventionally, the demodulation circuits are clocked by the synchronization signal samp_en at a clock frequency FClk, which is usually greater than the reception frequency of the data. The synchronization signal may be in a first state in which the demodulation circuits are active, and a second state in which the demodulation circuits are inactive. In its first state, the synchronization signal samp_en corresponds to a clock signal, and in its second state it corresponds to a low logical state. Thus, during normal operation, the samp_en signal is a periodic signal with a frequency proportional to the data reception frequency.

The deactivation and activation means of the logic circuits are designed to force the samp_en synchronization signal into its second state corresponding to logical level 0 when the $\overline{no\_signal}$ control signal is in the signal disappeared state, and to keep the synchronization signal in its first state corresponding to a clock signal when the control signal is in the signal present state.

To achieve this, the deactivation and activation means comprises an AND logic circuit that receives the $\overline{\text{no\_signal}}$ control signal on a first input from the second power control circuit P_Ctrl, and the synchronization signal samp_en on a second input. The output from the AND logic circuit is coupled to each of the demodulation circuits TL, CL, and EQU. In this exemplary embodiment, the output from the AND logic circuit is also coupled to the FEC circuit so that this circuit can be deactivated.

In this way, the samp_en synchronization signal is replaced by a logical AND between itself and the $\overline{\text{no\_signal}}$ signal with logical level 1 when the input signal is present and logical level 0 when the input signal is absent.

Thus, when the power control circuit P_Ctrl detects loss of the input signal corresponding to a logical level 0 of the $\overline{\text{no\_signal}}$ control signal in the state machine Aut, the signal output from the AND logic circuit is at logical level 0 regardless of the state of the synchronization signal samp_en, which is equivalent to forcing this synchronization signal into its second state in which the demodulation circuits are deactivated.

In this way, it is possible to avoid any desynchronization of the demodulation circuits if the input signal suddenly disappears for a short instant, and particularly to avoid any divergence in the different synchronization loops TL and C1 present in the demodulator device, and of the equalizer EQU and the FEC circuit in the embodiment in which it is also deactivated.

The characteristics of the signal after the communication has been restored, essentially composed of its frequencies and the channel estimate, are practically identical to the most recent estimates made by the demodulation circuits of the demodulator before the communication that caused the disappearance of the signal was cut off. Thus, when the communication is restored, the power control circuit P_Ctrl detects return of the input signal corresponding to a logical level 1 of the $\overline{\text{no\_signal}}$ control signal in the state machine Aut, and forcing of the synchronization signal samp_en is cancelled which effectively reactivates the demodulation circuits.

Consequently, as soon as the power control circuit P_Ctrl detects that the input signal has returned, the demodulation circuits on the output side of the power control circuit P_Ctrl are reactivated and synchronization is done much more quickly than using the conventional solution, which is equal to Tinterruption+TSyncFEC+TSyncBackEnd.

Therefore, the demodulation device of the present invention enables a fast start of the demodulation processing done by the demodulation circuits when the communication is restored following short interruptions in reception of the input signal.

However, in order to achieve these results, it must be possible to estimate the power P of the input signal within a sufficiently short time. If the estimating time of the power of the input signal is too long, this signal may be corrupted and there is a risk that the demodulation circuits of the demodulation device could be desynchronized.

In a context in which the constraint of needing to estimate the power within a sufficiently short time is unacceptable, the previous state machine may be replaced by a machine with three states. FIG. 5 shows management of the signal present and signal disappeared states by the state machine in a second operating mode of the present invention. As in FIG. 4, P is the current estimate of the power of the input signal made by the power estimating circuit Est_P. Th1 is the signal detection threshold and Th2 is the signal disappearance threshold. Typically, $Th1 \geq Th2$.

Therefore, the state machine Aut is designed to generate the $\overline{\text{no\_signal}}$ control signal in the signal present state when the estimated power P exceeds the first threshold Th1 ($P \geq Th1$) corresponding to the input signal presence detection threshold, and in the signal disappeared state when the estimated power P drops below the second threshold Th2 ($P < Th2$) corresponding to the input signal disappearance detection threshold.

However, in this embodiment, the demodulation device is provided with means for memorizing input signal demodulation parameters (such as reception frequency, carrier frequency, channel characteristic, etc.). Preferably, as illustrated in the figure, demodulation parameters are memorized every time that the input signal is detected present ($P \geq Th1$) for at least two successive power estimates. Means of configuring demodulation circuits in the demodulation device as a function of parameters stored during the first changeover of the $\overline{\text{no\_signal}}$ control signal from the signal absent state to the signal present state are also provided. Thus, when the control signal changes from the signal absent state ($P<Th2$) to the signal present state ($P \geq Th1$), the demodulation parameters are read in the storage means and are used to initialize the corresponding variables in the demodulation circuits of the demodulator.

Thus, in this embodiment, it is possible to start demodulation circuits more quickly after they have been deactivated and then reactivated following a short interruption in reception of the input signal.

Advantageously, the process that has just been described for deactivation and activation of the modulation circuits following a short interruption in signal reception is done automatically by the demodulator device without the need for any control external to the demodulator device, and in particular without any action by the software for control of the various operating modes of the reception system including the demodulator device.

Further, the demodulator device according to the present invention can easily be used in a system for reception of a modulated signal, and is particularly suited for signals modulated using the QAM modulation technique and transmitted through a cabled network.

The control method of the present invention can be embedded in hardware, software, or a combination of hardware and software. Any processor, controller, or other apparatus adapted for carrying out the functionality described herein is suitable. A typical combination of hardware and software could include a general purpose controller (or signal processor) with a control program that, when executed, carries out the functionality described herein.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A demodulation device having a demodulation stage that receives an input signal that is modulated, the demodulation device comprising:

a first power control circuit of the demodulation stage, the first power control circuit receiving the input signal of the demodulation stage, and keeping the amplitude of the input signal constant for slow fluctuations in the amplitude of the carrier;

a plurality of demodulation circuits coupled in series on the output side of the first power control circuit, the demodulation circuits receiving the input signal of the demodulation stage and applying a demodulation processing to the input signal;

a second power control circuit of the demodulation stage, the second power control circuit receiving the input signal of the demodulation stage, and generating a control signal having at least two states that include a signal present state representing detection of the presence of the input signal and a signal disappeared state representing detection of the disappearance of the input signal; and first means that receives the control signal generated by the second power control circuit, the first means deactivating the demodulation circuits when the control signal changes from the signal present state to the signal disappeared state so as to prevent the demodulation circuits from becoming desynchronized, and activating the demodulation circuits when the control signal changes from the signal disappeared state to the signal present state so as to enable a fast restart of the demodulation processing.

2. The demodulation device according to claim 1, wherein the demodulation circuits comprise two synchronization loops and an equalizing circuit.

3. The demodulation device according to claim 2, wherein the demodulation circuits further comprise an error correction circuit without a return channel.

4. The demodulation device according to claim 1, wherein the input signal is an amplitude and phase modulated signal using the QAM modulation technique that is transmitted through a cabled network.

5. A demodulation device comprising:

a first power control circuit for keeping the amplitude of a modulated input signal constant for slow fluctuations in the amplitude of the carrier;

a plurality of demodulation circuits coupled in series on the output side of the first power control circuit, the demodulation circuits receiving the modulated input signal and applying a demodulation processing to the input signal;

a second power control circuit generating a control signal having at least two states that include a signal present state representing detection of the presence of the input signal and a signal disappeared state representing detection of the disappearance of the input signal; and means for deactivating the demodulation circuits when the control signal changes from the signal present state to the signal disappeared state so as to prevent the demodulation circuits from becoming desynchronized, and for activating the demodulation circuits when the control signal changes from the signal disappeared state to the signal present state so as to enable a fast restart of the demodulation processing, wherein the demodulation circuits are clocked by a synchronization signal having a first state in which the demodulation circuits are active and a second state in which the demodulation circuits are inactive, and the means for deactivating and activating forces the synchronization signal into the second state when the control signal is in the signal disappeared state, and maintains the synchronization signal in the first state when the control signal is in the signal present state.

6. The demodulation device according to claim 5, wherein the means for deactivating and activating includes an AND logic circuit having one input that receives the control signal from the second power control circuit, another input that receives the synchronization signal, and an output coupled to each of the demodulation circuits.

7. The demodulation device according to claim 5, wherein the first state of the synchronization signal corresponds to a clock signal and the second state of the synchronization signal corresponds to a low logical state.

8. The A demodulation device comprising:

a first power control circuit for keeping the amplitude of a modulated input signal constant for slow fluctuations in the amplitude of the carrier;

a plurality of demodulation circuits coupled in series on the output side of the first power control circuit, the demodulation circuits receiving the modulated input signal and applying a demodulation processing to the input signal;

a second power control circuit generating a control signal having at least two states that include a signal present state representing detection of the presence of the input signal and a signal disappeared state representing detection of the disappearance of the input signal; and means for deactivating the demodulation circuits when the control signal changes from the signal present state to the signal disappeared state so as to prevent the demodulation circuits from becoming desynchronized, and for activating the demodulation circuits when the control signal changes from the signal disappeared state to the signal present state so as to enable a fast restart of the demodulation processing, wherein the second power control circuit includes a power estimating circuit that estimates the power of the input signal, and a state machine having at least two states controlled by a double threshold detection with hysteresis, and the state machine generates the control signal in the signal present state when the estimated power exceeds a first threshold, and generates the control signal in the signal disappeared state when the estimated power is lower than a second threshold.

9. The demodulation device according to claim 8, further comprising:

means for memorizing demodulation parameters of the input signal whenever the input signal is detected as being present during at least two successive power estimates; and means for configuring the demodulation circuits as a function of the memorized parameters when the control signal changes from the signal disappeared state to the signal present state.

10. A system for receiving a modulated signal, said system comprising:

a channel selector device for transposing the modulated, signal so as to produce a first signal that is modulated; and a demodulation device coupled to the channel selector device, the demodulation device including:

a first power control circuit receiving the first signal from the channel selector device, and keeping the amplitude of the first signal constant for slow fluctuations in the amplitude of the carrier;

a plurality of demodulation circuits coupled in series on the output side of the first power control circuit, the demodulation circuits receiving the first signal from the channel selector device and applying a demodulation processing to the first signal;

a second power control circuit receiving the first signal from the channel selector device, and generating a control signal having at least two states that include a signal present state representing detection of the presence of the first signal and a signal disappeared state representing detection of the disappearance of the first signal; and first means that receives the control signal generated by the second power control circuit, the first means deactivating the demodulation circuits when the control signal changes from the signal present state to the signal disappeared state so as to prevent the demodulation circuits from becoming desynchronized, and for activating the demodulation circuits when the control signal changes from the signal disappeared state to the signal present state so as to enable a fast restart of the demodulation processing.

11. The system according to claim 10,
wherein the demodulation circuits of the demodulation device are clocked by a synchronization signal having a first state in which the demodulation circuits are active and a second state in which the demodulation circuits are inactive, and
the first means forces the synchronization signal into the second state when the control signal is in the signal disappeared state, and maintains the synchronization signal in the first state when the control signal is in the signal present state.

12. The system according to claim 10,
wherein the second power control circuit of the demodulation device includes a power estimating circuit that estimates the power of the first signal, and a state machine having at least two states controlled by a double threshold detection with hysteresis, and
the state machine generates the control signal in the signal present state when the estimated power exceeds a first threshold, and generates the control signal in the signal disappeared state when the estimated power is lower than a second threshold.

13. The system according to claim 12, wherein the demodulation device further comprises:
means for memorizing demodulation parameters of the first signal whenever the first signal is detected as being present during at least two successive power estimates; and
means for configuring the demodulation circuits as a function of the memorized parameters when the control signal changes from the signal disappeared state to the signal present state.

14. The system according to claim 10, wherein the demodulation circuits of the demodulation device comprise two synchronization loops and an equalizing circuit.

15. The system according to claim 14, wherein the demodulation circuits of the demodulation device further comprise an error correction circuit without a return channel.

16. A method for demodulating a modulated input signal, said method comprising the steps of:
keeping the amplitude of a modulated input signal constant for slow fluctuations in the amplitude of the carrier;
selectively applying a demodulation processing to the input signal;
generating a control signal having at least two states that include a signal present state representing detection of the presence of the input signal and a signal disappeared state representing detection of the disappearance of the input signal;
deactivating application of the demodulation processing when the control signal changes from the signal present state to the signal disappeared state so as to prevent desynchronization of the demodulation processing;
activating application of the demodulation processing when the control signal changes from the signal disappeared state to the signal present state so as to enable a fast restart of the demodulation processing; and
clocking the demodulation processing by a synchronization signal having a first state in which the demodulation processing is activated and a second state in which the demodulation processing is deactivated,
wherein the deactivating step comprises forcing the synchronization signal into the second state, and
the activating step comprises forcing the synchronization signal into the first state.

17. A method for demodulating a modulated input signal, said method comprising the steps of:
keeping the amplitude of a modulated input signal constant for slow fluctuations in the amplitude of the carrier;
selectively applying a demodulation processing to the input signal;
generating a control signal having at least two states that include a signal present state representing detection of the presence of the input signal and a signal disappeared state representing detection of the disappearance of the input signal;
deactivating application of the demodulation processing when the control signal changes from the signal present state to the signal disappeared state so as to prevent desynchronization of the demodulation processing;
activating application of the demodulation processing when the control signal changes from the signal disappeared state to the signal present state so as to enable a fast restart of the demodulation processing;
selectively memorizing demodulation parameters of the input signal; and
configuring the demodulation processing as a function of the memorized parameters when the control signal changes from the signal disappeared state to the signal present state.

18. The method according to claim 16, wherein the demodulation processing comprises correcting errors between data sending and reception frequencies, correcting errors between data modulation and demodulation frequencies, and correcting linearity defects.

19. The method according to claim 18, wherein the demodulation processing further comprises correcting errors and eliminating redundancy.

* * * * *